United States Patent
Ideguchi et al.

(10) Patent No.: US 11,252,265 B2
(45) Date of Patent: Feb. 15, 2022

(54) PACKET COMMUNICATION SYSTEM AND METHOD

(71) Applicant: Hitachi, Ltd., Tokyo (JP)

(72) Inventors: Kota Ideguchi, Tokyo (JP); Eriko Ando, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 16/564,426

(22) Filed: Sep. 9, 2019

(65) Prior Publication Data
US 2020/0274951 A1 Aug. 27, 2020

(30) Foreign Application Priority Data
Feb. 26, 2019 (JP) .............................. JP2019-032737

(51) Int. Cl.
| | | |
|---|---|---|
| *H04L 29/06* | (2006.01) | |
| *H04L 12/26* | (2006.01) | |
| *H04L 12/755* | (2013.01) | |

(52) U.S. Cl.
CPC .......... *H04L 69/22* (2013.01); *H04L 43/0852* (2013.01); *H04L 45/021* (2013.01); *H04L 69/04* (2013.01)

(58) Field of Classification Search
CPC ... H04L 69/22; H04L 45/021; H04L 43/0852; H04L 69/04; H04L 29/06; H04L 12/26; H04L 12/755; H04L 69/164; H04L 47/34; H04L 12/801
USPC ................. 709/224, 223; 340/16.1; 370/252; 714/39
See application file for complete search history.

(56) References Cited

U.S. PATENT DOCUMENTS

| | | | | |
|---|---|---|---|---|
| 8,825,900 | B1* | 9/2014 | Gross, IV | H04L 47/31 709/238 |
| 2005/0207408 | A1* | 9/2005 | Elliott | H04L 69/04 370/389 |
| 2007/0041382 | A1* | 2/2007 | Vayanos | H04L 9/06 370/394 |
| 2008/0069149 | A1* | 3/2008 | Poulin | H04L 12/5601 370/503 |
| 2013/0294431 | A1* | 11/2013 | Wang | H04W 72/04 370/338 |
| 2016/0309364 | A1* | 10/2016 | Maheshwari | H04L 69/04 |
| 2019/0297533 | A1* | 9/2019 | Liedes | H04L 29/06 |

FOREIGN PATENT DOCUMENTS

JP 2014-147099 A 8/2014

* cited by examiner

*Primary Examiner* — Tonia L Dollinger
*Assistant Examiner* — Mehulkumar J Shah
(74) *Attorney, Agent, or Firm* — Crowell & Moring LLP

(57) ABSTRACT

A packet according to a secure protocol over a high-speed protocol has a small size header. A reception system estimates a packet number which is used in processing of a packet having a small size header on the basis of information indicating a packet number of a received packet. The header of each of one or more packets among N packets (where N is an integer of two or more) is a small size header, which is either a first header having one part of the packet number of the packet or a second header without the packet number of the packet. When the small size header is the first header, the header of each of the N packets is the first header. When the small size header is the second header, the header of each of the packets other than one packet among the N packets is the second header.

8 Claims, 9 Drawing Sheets

FIG. 4

Server packet DB
211S

| Session# /401S | Packet# /402S | Others /403S |
|---|---|---|
| 1 | epoch: 0000000000000010<br>sequence_number:<br>000000000000000000000000000000000000000000001 | ... |
| ... | ... | ... |

FIG. 5

Server packet DB
211C

| Session# /401C | Packet# /402C | Others /403C |
|---|---|---|
| 1 | epoch:0000000000000010<br>sequence_number:<br>000000000000000000000000000000000000000000001 | ... |
| ... | ... | ... |

FIG. 6

Client packet DB
212S

| Session# /601S | Packet# /602S | Others /603S |
|---|---|---|
| 11 | epoch: 0000000000000110<br>sequence_number:<br>000000000000000000000000000000000000000000000001 | ... |
| ... | ... | ... |

FIG. 7

Client packet DB
212C

| Session# /601C | Packet# /602C | Others /603C |
|---|---|---|
| 11 | epoch:0000000000000110<br>sequence_number:<br>000000000000000000000000000000000000000000000001 | ... |
| ... | ... | ... |

COMPARATIVE EXAMPLE

PACKET COMMUNICATION SYSTEM AND METHOD

CROSS-REFERENCE TO PRIOR APPLICATION

This application relates to and claims the benefit of priority from Japanese Patent Application number 2019-32737, filed on Feb. 26, 2019 the entire disclosure of which is incorporated herein by reference.

BACKGROUND

The present invention generally relates to packet communication.

As an example of packet communication, there is packet communication that is performed between an IoT (Internet of Things) server and IoT devices. An IoT server is an example of a server in packet communication and an IoT device is an example of a client in packet communication. In the IoT, many IoT devices such as sensor devices can serve as clients.

As the IoT, in which so-called things are linked to the internet, progresses, establishing the security of IoT devices is becoming an important societal problem. The IoT has the following features, for example, and there is a need for security technology suited to these features.
(1) Low-level specifications. The processor speed, memory capacity, battery capacity and so forth of IoT devices are typically low. Consequently, there is a need to be able to implement security using minimal resources.
(2) Large numbers of IoT devices. IoT devices are said to reach ten billion units in 2020, and the volume of communication data flowing through networks is also increasing accordingly. In order to efficiently utilize a communication infrastructure, security needs to be realized using a minimal volume of communication data.
(3) Real time performance. An example of a use case where IoT devices are typically used is sensor data and probe data transmissions. For this kind of data, real time performance is seen as important. Therefore, in IoT-related packet communications, a highly reliable protocol which is a protocol that guarantees packet arrival (for example, TCP (Transmission Control Protocol)) is not adopted, rather, a high-speed protocol, for example, UDP (User Datagram Protocol) is adopted, which is a protocol for which there is no packet arrival guarantee and reliability is therefore low but which is capable of high-speed packet communication when compared with a high-reliability protocol.

According to such characteristics, realizing secure packet communication via a high-speed protocol is desirable.

One example of a method for realizing secure packet communication that may be mentioned is encryption. As encryption-related technology, the technology disclosed in PTL 1, for example, is known.
[PTL 1] Japanese Unexamined Patent Application Publication No. 2014-147099.

SUMMARY

Protocols that enable secure packet communication over UDP include DTLS (Datagram Transport Layer Security). DTLS can be called TLS which operates over UDP. More specifically, when data transmitted using UDP is encrypted, if a packet containing encrypted data is lost, a synchronization lag arises, and consequently data in a packet can no longer be decrypted, but with DTLS, a packet number is described in the DTLS header, and recovery from a synchronization lag is possible by using the packet number. With DTLS, a packet number is typically configured from an epoch, which is updated upon each session update, and a sequence_number, which is a serial number of the session, and therefore, in one session, the packet number corresponds to the sequence number.

DTLS is faced with the following problems. That is, UDP is essentially a protocol with a lighter processing load than TCP, but with DTLS/UDP (DTLS over UDP), a packet number, which does not exist for TLS/TCP (TLS over TCP), is added to the header. Therefore, packets according to DTLS/UDP end up being packets with a heavier communication load than TLS packets. As a result, the packet communication efficiency drops. Eliminating an inversion phenomenon like the foregoing is desirable. Problems of this kind are not limited to DTLS/UDP, and can also arise for packet communication using a secure protocol (more specifically, a protocol enabling secure packet communication in which a packet number is described in the header) over a high-speed protocol (more specifically, a protocol in which a packet number is not added and with no packet arrival guarantee).

PTL 1 discloses that an output packet includes a partial sequence number derived from a full sequence number, and that packet overhead is reduced.

However, the technology of PTL 1 is RLC-related technology with a delivery confirmation function (in other words, a packet arrival guarantee function) as per "Here, a technology that employs a single full sequence number for encryption and reordering is described. This technology is capable of reducing the overhead of each packet and of providing a sequence number which is synchronized for RLC during handover." and "Radio Link Control (RLC) can be used for a variety of packets as in reordering of reception packets, lost packet detection, and retransmission of erroneously received or lost reception packets." PTL 1 neither discloses nor suggests the foregoing problems. Therefore, the foregoing problems cannot be resolved by using the technology of PTL 1.

A packet according to a secure protocol over a high-speed protocol has a small size header. In a reception system, a packet number which is used for processing of a packet having a small size header is estimated on the basis of information indicating a packet number for a received packet. The header of each of one or more packets among N packets (where N is an integer of two or more) is a small size header, which is either a first header having one part of the packet number of the packet or a second header without the packet number of the packet. When the small size header is the first header, the header of each of the N packets is the first header. When the small size header is the second header, the header of each of the packets other than one packet among the N packets is the second header.

A drop in the communication efficiency of packets according to a secure protocol over a high-speed protocol can be reduced.

BRIEF DESCRIPTION OF THE DRAWINGS

FIG. 4 illustrates a configuration of a server packet DB of an IoT server.

FIG. 5 illustrates a configuration of a server packet DB of an IoT device.

FIG. 6 illustrates a configuration of a client packet DB of an IoT server.

FIG. 7 illustrates a configuration of a client packet DB of an IoT device.

DESCRIPTION OF EMBODIMENTS

Figure 1:
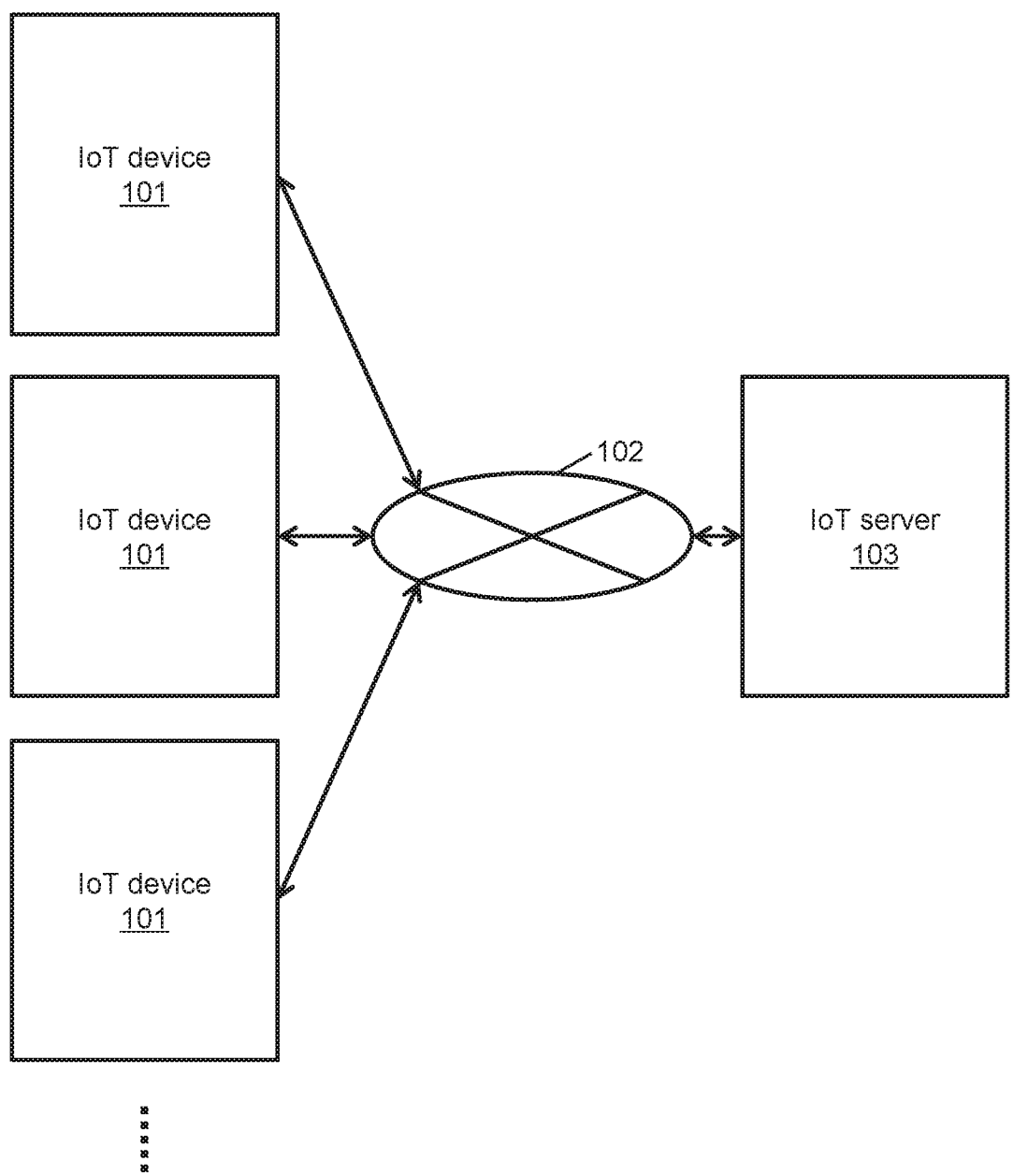
FIG. 1 illustrates a configuration of a client-server system according to an Embodiment 1.

In the description hereinbelow, 'interface unit' may refer to one or more interfaces. The one or more interfaces may be one or more communication interface devices of the same type (for instance, one or more NIC (Network Interface Cards)) or may be two or more communication interface devices of different types (for instance, an NIC and an HBA (Host Bus Adapter)).

Furthermore, in the description hereinbelow, 'memory unit' may be one or more memories and may, typically, be a main storage device. At least one memory in a memory unit may be a volatile memory or may be a nonvolatile memory.

Furthermore, in the description hereinbelow, 'PDEV unit' may be one or more PDEV and may, typically, be an auxiliary memory device. 'PDEV' signifies a physical storage device (Physical storage DEVice), and is typically a nonvolatile storage device such as an HDD (Hard Disk Drive) or SSD (Solid State Drive), for example.

Furthermore, in the description hereinbelow, 'storage unit' is at least one of a memory unit and at least a portion of a PDEV unit (typically, at least a memory unit).

In addition, in the description hereinbelow, 'arithmetic processing unit' is one or more arithmetic processing modules. At least one arithmetic processing module is typically a microprocessor such as a CPU (Central Processing Unit) but could also be another type of arithmetic processing module such as a GPU (Graphics Processing Unit). The processor which is the at least one arithmetic processing module could be a single-core or multi-core processor. At least one arithmetic processing module could also be an arithmetic processing module in a broader sense such as a hardware circuit which performs some or all of the processing (an FPGA (Field-Programmable Gate Array) or an ASIC (Application Specific Integrated Circuit), for example.)

Moreover, although information for which an output is obtained in response to an input is described in the description hereinbelow by using expressions such as 'xxx DB' ('DB' is an abbreviation for database), this information could also be data of any structure or could be a learning model such as a neural network which generates an output in response to an input. Therefore, 'xxx table' can be referred to as 'xxx information.' Moreover, in the description hereinbelow, the configuration of each table is an example, and one table may be divided into two or more tables, or all or a portion of two or more tables could also be one table.

Furthermore, in the description hereinbelow, although functions are sometimes described by means of the expression 'kkk unit' (excluding the interface unit, storage unit and arithmetic processing unit), the functions may also be realized as a result of one or more computer programs being executed by an arithmetic processing unit or may be realized by one or more hardware circuits (for example, an FBGA or ASIC). When the functions are realized as a result of programs being executed by an arithmetic processing unit, prescribed processing is performed while suitably using a storage unit and/or an interface unit, and the like, and hence the functions may use at least a portion of an arithmetic processing unit. Processing which is described with a function serving as the subject of the sentence may be processing that is performed by an arithmetic processing unit or by an apparatus which comprises an arithmetic processing unit. A program could also be installed from a program source. The program source could, for example, also be a program distribution computer or a computer-readable recording medium (for example, a non-temporary recording medium). The description of each function is an example, and a plurality of functions may be aggregated as one function, or one function may be divided into a plurality of functions.

Furthermore, in the description hereinbelow, when elements of the same type are described without distinction, a common reference sign portion is sometimes used, and when elements of the same type are described with distinction, reference signs are sometimes used. For example, when no distinction is made between reception processing units, same are sometimes called 'reception processing units 130,' and when a distinction is made between reception processing units, same are sometimes called 'reception processing unit 130S' and 'reception processing unit 130C.'

A few embodiments of the present invention will be described hereinbelow with reference to the drawings. Note that DTLS/UDP has been adopted in the embodiments hereinbelow. That is, UDP has been adopted as the high-speed protocol, and DTLS has been adopted as the secure protocol over high-speed protocol. Therefore, packets which are sent and received in the embodiments hereinbelow are packets according to DTLS/UDP. However, the present invention can also be applied to protocols other than DTLS/UDP.

Embodiment 1

FIG. 1 illustrates a configuration of a client-server system according to an Embodiment 1.

A plurality of IoT devices 101 each exist as an example of a client and an IoT server 103 exists as an example of a server. Communication is performed between each of the plurality of IoT devices 101 and the IoT server 103 via a communication network 102 such as a wireless communication network.

A variety of devices may be adopted as the IoT devices 101. For example, the IoT devices 101 may each be a sensor device (or another type of device) installed in a factory, and the IoT server 103 may be a server that collects data from each of the IoT devices 101 in the factory.

In this embodiment, the IoT devices 101 and IoT server 103 are all capable of transmitting packets and receiving packets. That is, the IoT devices 101 are capable of operating as an example of a transmission system and also as an example of a reception system, and similarly the IoT server 103 is capable of operating as an example of a reception system and also as an example of a transmission system. However, not being limited to the foregoing, the IoT devices 101 may also be capable of operating as an example of a transmission system but be incapable of operating as an example of a reception system. Furthermore, the IoT server 103 may also be capable of operating as an example of a reception system but be incapable of operating as an example of a transmission system.

In addition, at least one of 'reception system' and 'transmission system' may be a computer system having an interface unit, a storage unit, and an arithmetic processing unit which is coupled to the interface unit and storage unit (for example, one or more physical computers) or may be a system realized on a computer system such as a cloud-based system (cloud computing service, for example). Note that the present invention is particularly useful in a packet transmission system which has characteristics like the foregoing characteristics of the IoT (low specifications, multiple transmission systems, and real time performance).

Figure 2:
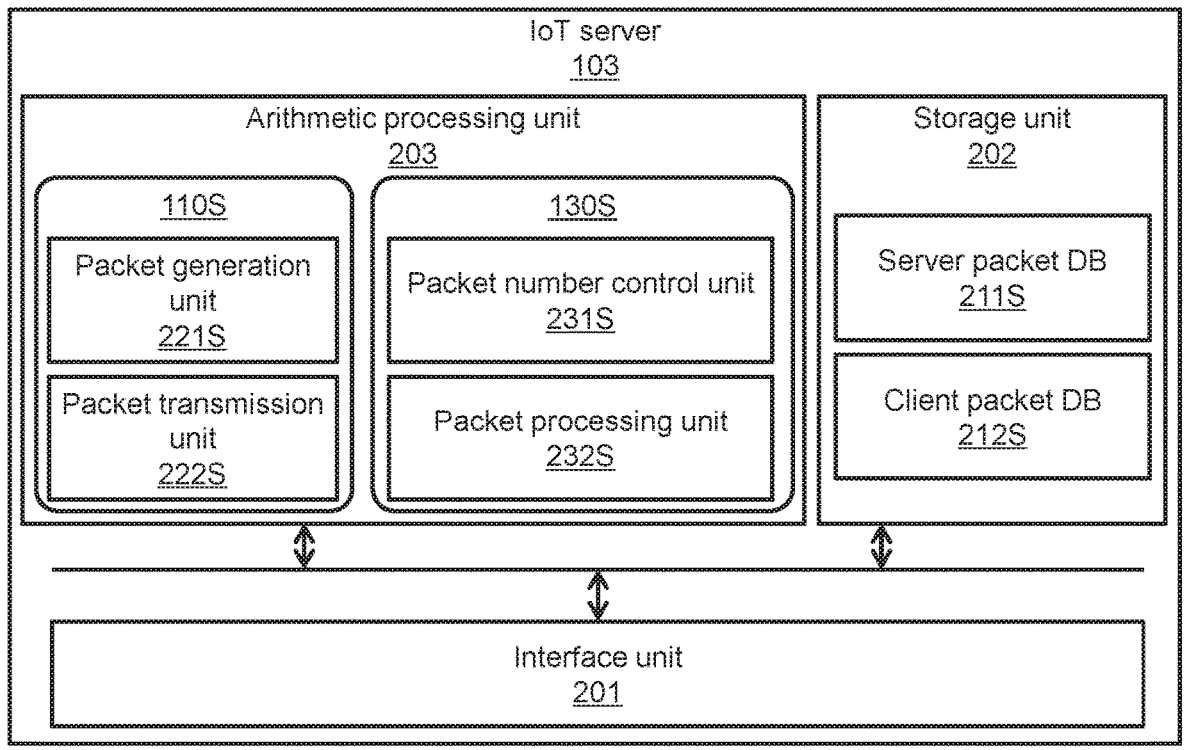
FIG. 2 illustrates a configuration of an IoT server.

FIG. 2 illustrates a configuration of the IoT server 103.

The IoT server 103 is typically a computer system (one or more computers) and includes an interface unit 201, a storage unit 202, and an arithmetic processing unit 203 which is coupled to the interface unit 201 and storage unit 202.

Communication with each of the IoT devices 101 is implemented via the interface unit 201.

The storage unit 202 stores information which is referred to or updated by one or more computer programs executed by the arithmetic processing unit 203 or by the arithmetic processing unit 203. An example of such information is a server packet DB 211C and a client packet DB 212S. From the perspective of the IoT server 103, the server packet DB 211C is an example of transmission packet information in which packet numbers at the time of transmission are recorded, and the client packet DB 212S is an example of reception packet information in which packet numbers for the received packets are recorded.

As a result of the arithmetic processing unit 203 executing one or more computer programs, functions such as a transmission processing unit 110S and a reception processing unit 130S are realized.

The transmission processing unit 110S performs packet transmission. More specifically, for example, the transmission processing unit 110S includes a packet generation unit 221S and a packet transmission unit 222S. The packet generation unit 221S generates packets according to DTLS/UDP. The packet transmission unit 222S transmits the generated packets.

The reception processing unit 130S receives packets and processes the packets. More specifically, for example, the reception processing unit 130S includes a packet number control unit 231S and a packet processing unit 232S. The packet number control unit 231S estimates packet numbers for received packets having a small size header on the basis of the client packet DB 212S. The packet processing unit 232S performs processing of the received packets by using the estimated packet numbers.

Figure 3:
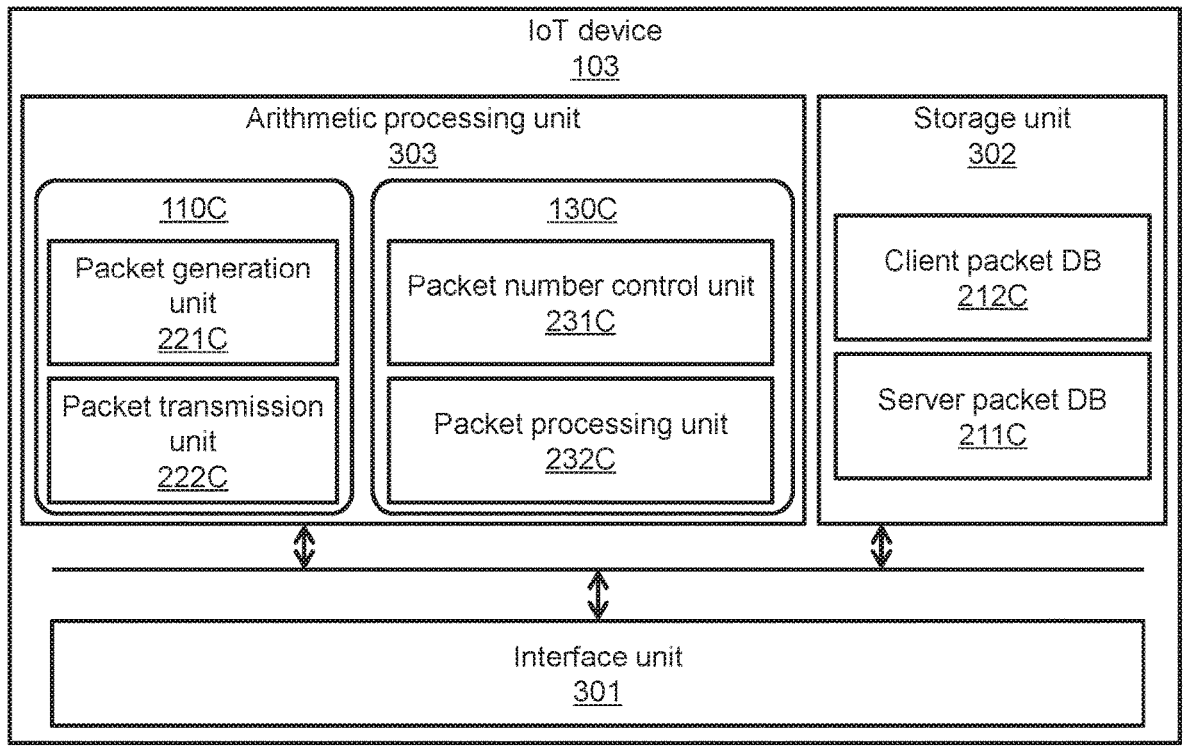
FIG. 3 illustrates a configuration of an IoT device.

FIG. 3 illustrates a configuration of an IoT device 101.

The IoT device 101 is typically a low-specification device in comparison with at least IoT device 101, like a sensor device, and includes an interface unit 301, a storage unit 302, and an arithmetic processing unit 303 which is coupled to the interface unit 301 and storage unit 302.

Communication with the IoT server 103 is implemented via the interface unit 301.

The storage unit 302 stores information which is referred to or updated by one or more computer programs executed by the arithmetic processing unit 303 or by the arithmetic processing unit 303. An example of such information is a client packet DB 211C and a server packet DB 212C. From the perspective of the IoT device 101, the client packet DB 211C is an example of transmission packet information in which packet numbers at the time of transmission are recorded, and the server packet DB 212C is an example of reception packet information in which packet numbers for the received packets are recorded.

As a result of the arithmetic processing unit 303 executing one or more computer programs, functions such as a transmission processing unit 110C and a reception processing unit 130C are realized. The transmission processing unit 110C and the reception processing unit 130C are like the foregoing transmission processing unit 110S and the reception processing unit 130S. That is, the transmission processing unit 110C includes a packet generation unit 221C and a packet transmission unit 222C. The reception processing unit 130C includes a packet number control unit 231C and a packet processing unit 232C.

FIG. 4 illustrates a configuration of a server packet DB 211S of the IoT server 103. FIG. 5 illustrates a configuration of a server packet DB 211C of the IoT device 101.

The server packet DB 211 has an entry for each session, for example. Each entry holds information such as a session #401, a packet #402, and OTHERS 403, for example. The session #401 indicates the number of a session. The packet #402 indicates the packet number of a packet. OTHERS 403 is information other than the session number and packet number. At least OTHERS 403 may be dispensed with. The server packet DB 211 is not limited to having an entry for each session, and may instead have an entry for each session and each portion of the packet number, for example.

In DTLS/UDP, the packet number is a number configured from an epoch and sequence_number. epoch is a number which is updated according to the generation of a connection in a session, and is an example of a number of a first type. The sequence_number is a number which is updated for each transmission in the same connection, and is an example of a number of a second type. epoch is two bytes (sixteen bits), for example, and the sequence_number is six bytes (forty-eight bits), for example.

A packet #402S which is recorded in the server packet DB 211S of the IoT server 103 indicates the packet number of a packet transmitted from the IoT server 103. A packet #402C which is recorded in the server packet DB 211C of the IoT device 101 indicates the packet number of a packet transmitted from the IoT server 103.

FIG. 6 illustrates a configuration of a client packet DB 212S of the IoT server 103. FIG. 7 illustrates a configuration of a client packet DB 212C of the IoT device 101.

The client packet DB 212 has an entry for each session, for example. Each entry holds information such as a session #601, a packet #602, and OTHERS 603, for example. The information items 601 to 603 are the same as the information items 401 to 403. The client packet DB 212 is not limited to having an entry for each session, and may instead have an entry for each session and each portion of the packet number, for example.

The packet #402S which is recorded in the client packet DB 211S of the IoT server 103 indicates the packet number of a packet transmitted from the IoT device 101. The packet #402C which is recorded in the client packet DB 211C of the IoT device 101 indicates the packet number of a packet transmitted from the IoT server 103.

In this embodiment, for the sake of simplifying the description, the IoT devices 101 and session ID have a 1:1 ratio (one session is executed between one IoT device 101 and the IoT server 103), but the IoT devices 101 and session ID may also have a 1 to many ratio.

Figure 8:
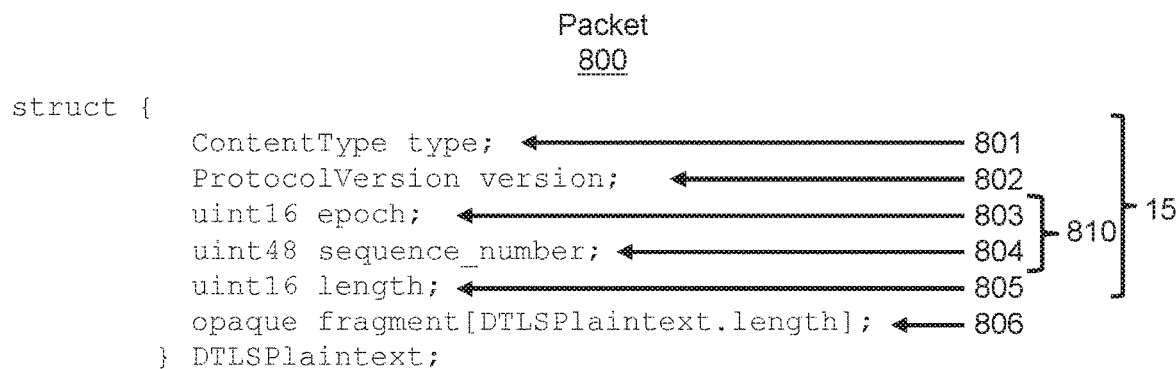
FIG. 8 illustrates a configuration of a packet according to a comparative example.

FIG. 8 illustrates a configuration of a packet according to a comparative example.

As illustrated in FIG. 8, a packet 800 according to a comparative example has a header 15 and an opaque 806. The opaque 806 corresponds to the main body of the packet and is typically encrypted data. Data obtained as a result of encrypted data being decrypted can also be called a 'message.'

The header 15 includes, for example, a ContentType 801, a ProtocolVersion 802, a packet number 810 (epoch 803 and a sequence_number 804), and a length 805.

The ContentType 801 is information of one byte, for example, indicating the type of message content. The ProtocolVersion 802 is information of two bytes, for example, indicating the DTLS version. epoch 803 is information of two bytes, for example. Sequence_number 804 is information of six bytes, for example. Therefore, the packet number 810 is information of eight bytes, for example. The length 805 indicates the length of the whole packet.

Figure 9:
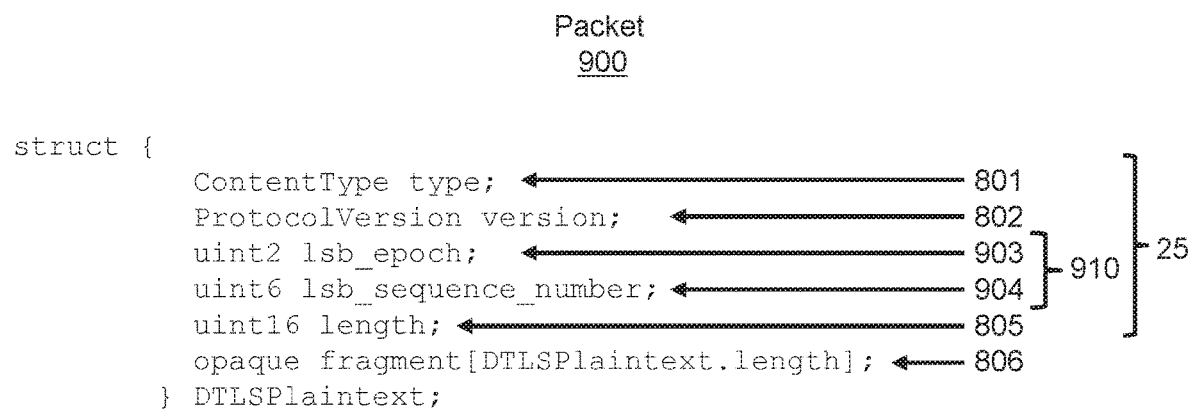
FIG. 9 illustrates a configuration of a packet according to Embodiment 1.

FIG. 9 illustrates a configuration of a packet according to an Embodiment 1.

A packet 900 according to Embodiment 1 has a header 25 and an opaque 806. The header 25 is an example of a first header. The first header is an example of a small size header. A 'small size header' is a header of a smaller size than the header 15.

The header 25 has, instead of the packet number 810, a partial packet number 910, which is one part of the packet number 810. The partial packet number 910 contains a lowest order nbit (n<P) (here, n=6) among P bits (here, P=64) which constitute the packet number 810. The value of n may be determined on the basis of an allowed synchronization lag. That is, where this configuration is concerned, according to results obtained by way of a keen observation by the present inventor, the present inventor discovered that even if a synchronization lag is generated, as long as this synchronization lag does not exceed the allowed synchronization lag, a synchronization lag exceeding the allowed synchronization lag can be prevented by using part of the packet number. Furthermore, one part of the packet number is the lowest order nbit of the packet number. Thus, because the size of the packet header can be made small, highly efficient packet communication can be realized, and more specifically, prevention of a synchronization lag exceeding the allowed synchronization lag can be implemented highly efficiently. Moreover, in this embodiment, highly efficient and secure packet communication can be realized, but 'secure' according to this embodiment corresponds to confidentiality and integrity in particular.

In this embodiment, the partial packet number 910 is configured from an lsb_epoch 903 and an lsb_sequence_number 904. The lsb_epoch 903 is the lowest order mbit (m<V) (here, m=2) among V bits (here, V=16) constituting the epoch. The lsb_sequence_number 904, which is the aforementioned lowest order nbit, is the lowest order nbit among W bits (here, W=48 bits) constituting the sequence_number (n<W<P). Accordingly, as will be described subsequently, a session is estimated from the partial packet 910, and highly efficient packet communication can be realized in the estimated session. Note that the foregoing n, m, P, and V are each natural numbers. More particularly, at least P is an integer of two or more. Moreover, at least one value of n and m may be different for each IoT device 101 or for each session.

Figure 10:
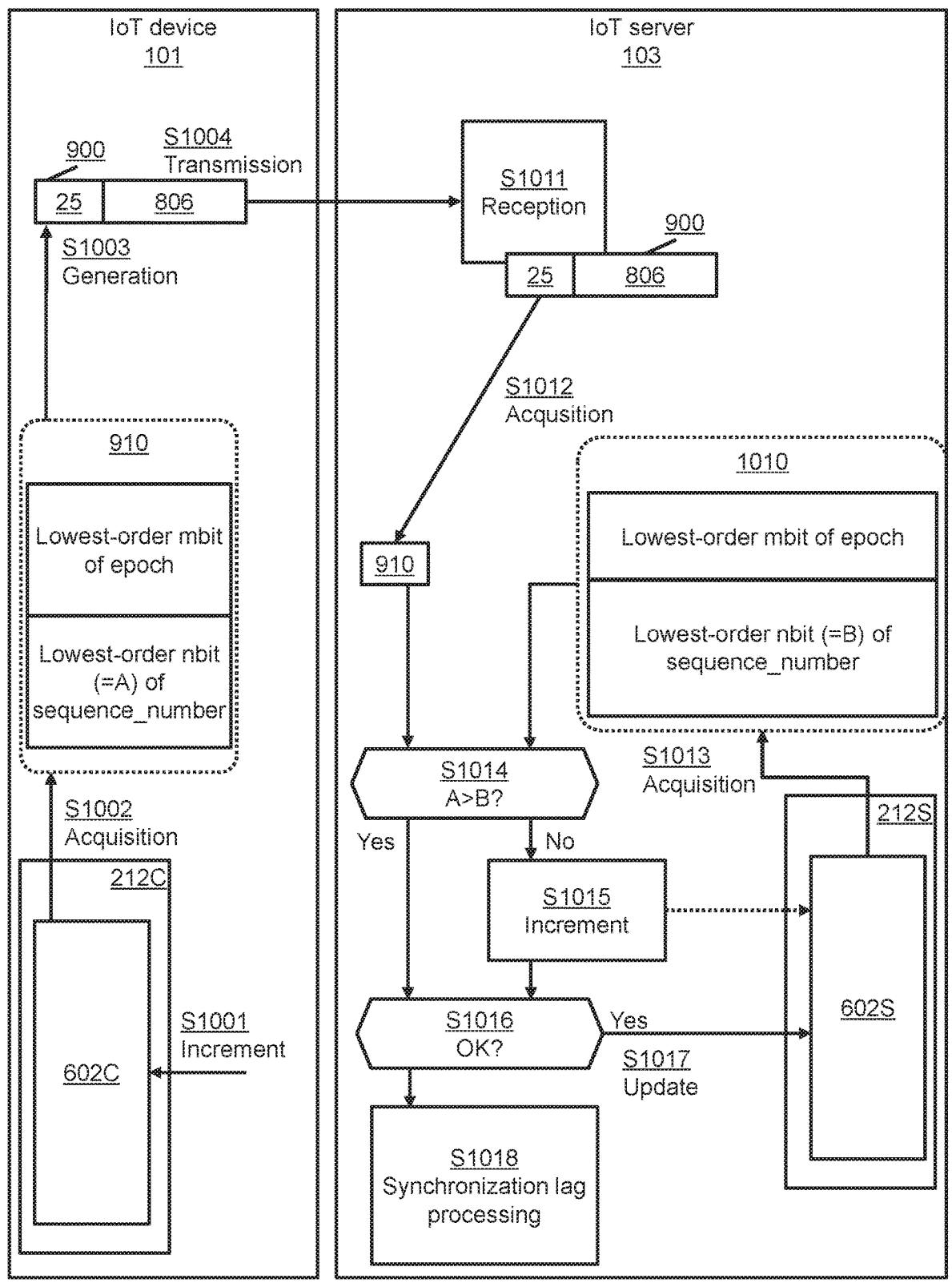
FIG. 10 illustrates the flow of packet send/receive processing according to Embodiment 1.

FIG. 10 illustrates the flow of packet send/receive processing according to Embodiment 1.

A handshake for establishing a session x (a session with the session number x) is implemented between the transmission processing unit 110C of the IoT device 101 and the reception processing unit 130S of the IoT server 103. In this handshake, the following is performed, for example (not illustrated):

The transmission processing unit 110C (the packet generation unit 221C, for example) describes, in an entry of the client packet DB 212C, a session #601C indicating the number of the session x, and a packet #602C indicating an initial value (all bits are '0,' for example). For example, the transmission processing unit 110C updates packet #602C, which corresponds to a pre-establishment session (x−1), to an initial value (all bits are '0,' for example), and updates a session #601C which corresponds to a pre-establishment session (x−1) to the session #601C which corresponds to session x.

The reception processing unit 110S (the packet number control unit 231S, for example) describes, in an entry of the client packet DB 212S, a session #601S indicating the number of the session x, and a packet #602S indicating an initial value (all bits are '0,' for example). For example, the reception processing unit 110S updates packet #602S, which corresponds to a pre-establishment session (x−1), to an initial value (all bits are '0,' for example), and updates a session #601S which corresponds to a pre-establishment session (x−1) to the session #601S which corresponds to session x.

Subsequently, the following is performed each time a packet is sent or received.

In the IoT device 101, the packet generation unit 221C increments the packet #602C, that is, updates the number indicated by the packet #602C to the next number (S1001). The packet generation unit 221C acquires the partial packet number 910 from the packet #602C (information configured from the lowest order mbit in the epoch and the lowest order nbit in the sequence_number) (S1002). The packet generation unit 221C generates a packet 900 which includes the header 25 containing the acquired partial packet number 910, and the opaque 806 (encrypted data of a message) (S1003). The packet transmission unit 222C transmits the generated packet 900 to the IoT server 103 (S1004).

Note that the message is encrypted using the packet #602C (full size packet number), for example. Furthermore, the packet may also include a link data MAC (an HMAC (Hash-based MAC (Message Authentication Code), for example) containing a link between the packet #602C (full size packet number) and the message.

In the IoT server 103, the reception processing unit 130S receives the packet 900 (S1011).

The packet number control unit 231S acquires the partial packet number 910 from the header 25 of the received packet 900 (S1012). Furthermore, the packet number control unit 231S acquires a partial packet number 1010 from the packet #602S (S1013).

The packet number control unit 231S determines whether or not the value indicated by the lowest order nbit in the partial packet number 910 is greater than the value indicated by the foregoing lowest order nbit in the partial packet number 1010 (S1014).

When the determination result of S1014 is false (S1014: No), that is, when the value indicated by the foregoing lowest order nbit in the partial packet number 910 is smaller than the lowest order nbit in the partial packet number 1010, the packet number control unit 231S increments the upper (W-n) bits (here, the upper forty-two bits) of the lowest order nbit in the sequence_number of the packet #602S (S1015). That is, it is estimated that a so-called carry over exceeding the maximum value indicated by the lowest order nbit arises.

When the determination result of S1014 is true (S1014: Yes), the packet number control unit 231S estimates that the packet number of the received packet 900 is a combination of the upper (W-n) bits of the packet #602S and the lowest order nbit in the acquired partial packet number 910. On the other hand, when the determination result of S1014 is false (S1014: No), S1015 is performed, and hence the packet number control unit 231S estimates that the packet number of the received packet 900 is a combination of the incremented upper (W-n) bits of the packet #602S and the lowest order nbit in the acquired partial packet number 910.

The packet processing unit 232S performs processing of the packet 900 by using the estimated packet number. The specific details are as follows, for example.

That is, the packet processing unit 232S determines whether or not the estimated packet number is OK (S1016). More specifically, the following is performed, for example.

The packet processing unit 232S decrypts the opaque 806 (encrypted data) by using the estimated packet number.

The packet processing unit 232S calculates the MAC by using the message obtained through decryption, and the estimated packet number.

The packet processing unit 232S determines whether or not the calculated MAC matches the MAC which the received packet 900 contains. If the MACs match, the estimated packet number is OK. In other words, when there is a synchronization lag exceeding the allowed synchronization lag, the MACs do not match.

When the determination result of S1016 is true (S1016: Yes), the packet processing unit 232S updates the packet #602S to the estimated packet number (S1017).

When the determination result of S1016 is false (S1016: No), the packet processing unit 232S performs synchronization lag processing (S1018). The synchronization lag processing may be processing including any of the following, for example.

Restore packet #602S (rollback).

Update the packet #602S to the estimated packet number in a case where the determination result of S1016 is false.

The foregoing is a description of Embodiment 1.

Note that, in Embodiment 1, in a situation where a synchronization lag is not generated, packet #602C and packet #602S match prior to packet transmission. However, the present invention is not limited to this kind of example, rather, in a situation where a synchronization lag is not generated, packet #602C may be one larger than packet #602S prior to packet transmission. For example, in the IoT device 101, the packet generation unit 221C may not update packet #602C prior to packet generation and acquire the partial packet number from the pre-update packet #602C, generate the packet 900 with the header 25 containing the acquired partial packet number 910, and then update the packet #602C.

Furthermore, at least one value of the foregoing m and n may be variable. For example, in a handshake between the IoT device 101 and the IoT server 103, the transmission processing unit 110C and the reception processing unit 130S are capable of specifying the communication quality between the IoT device 101 and IoT server 103. Therefore, at least one value of the foregoing m and n (for example, the value of n of the lowest order nbit in the sequence_number) may be determined on the basis of the specified communication quality and allowed synchronization lag by means of at least one of the transmission processing unit 110C and the reception processing unit 130S (by means of the packet number control unit 231S in the reception processing unit 130S, for example) in the handshake.

In addition, although a detailed description is omitted, in the IoT device, the packet generation unit 221C may search the client packet DB 212C before S1001, using the session number and epoch as search keys, and acquire the packet #602C. In the IoT server, the packet generation unit 221C may search the client packet DB 212S before S1013, using the session number and epoch lowest order mbit as search keys, and acquire the largest #602S in the search results.

Embodiment 2

An Embodiment 2 will be described. In so doing, points of difference from Embodiment 1 will mainly be described, while a description of points in common with Embodiment 1 will be omitted or simplified.

Figure 11:
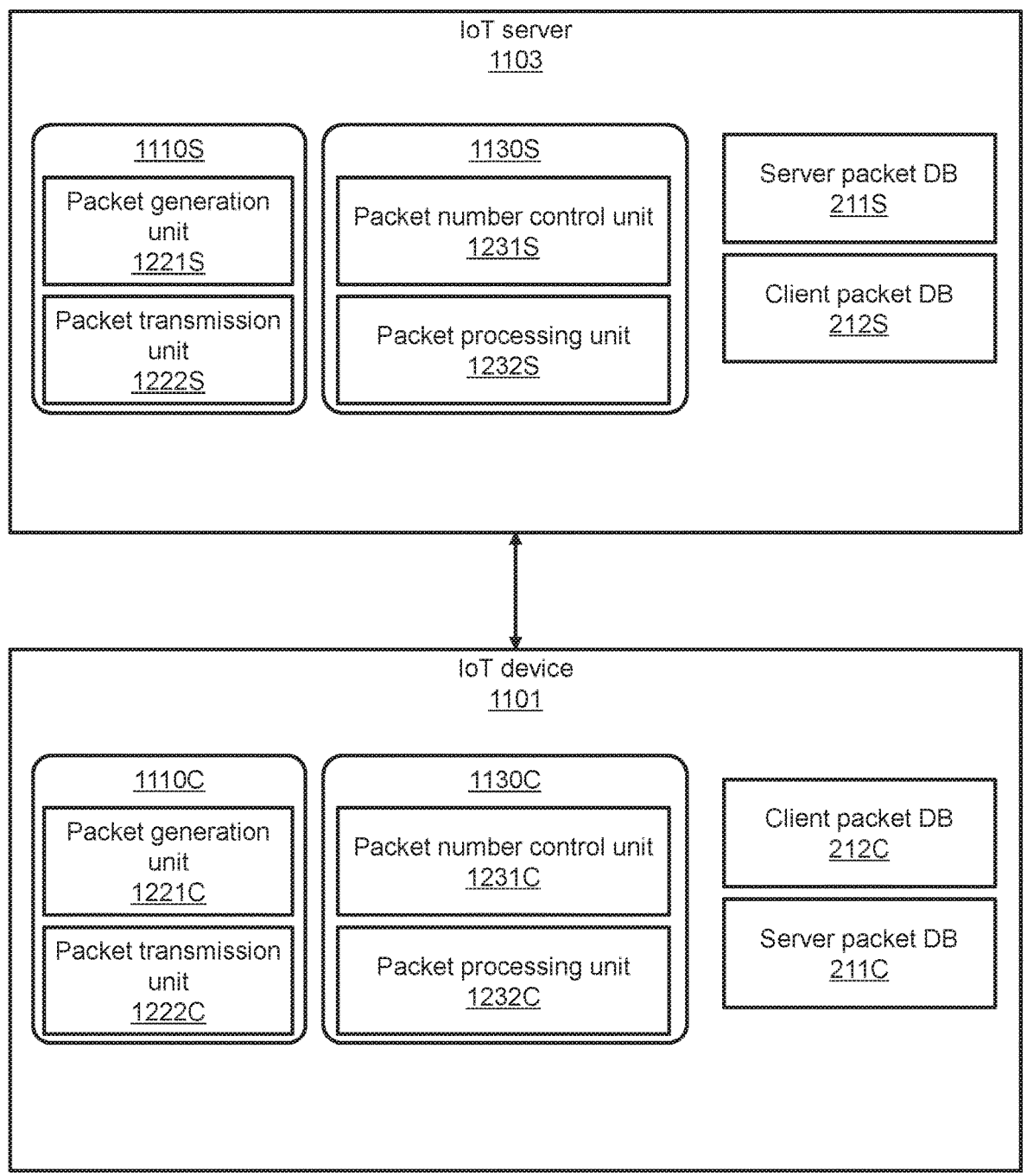
FIG. 11 illustrates functions of an IoT server and an IoT device according to an Embodiment 2.

FIG. 11 illustrates functions of an IoT server and an IoT device according to Embodiment 2.

A transmission processing unit 1110S (a packet generation unit 1221S and a packet transmission unit 1222S) and a reception processing unit 1130S (a packet number control unit 1231S and a packet processing unit 1232S) of an IoT server 1103 are different from the transmission processing unit 110S and the reception processing unit 130S in Embodiment 1.

Similarly, a transmission processing unit 1110C (a packet generation unit 1221C and a packet transmission unit 1222C) and a reception processing unit 1130C (a packet number control unit 1231C and a packet processing unit 1232C) of an IoT device 1101 are different from the transmission processing unit 110C and the reception processing unit 130C in Embodiment 1.

In Embodiment 2, a header without either a packet number or a partial packet number is adopted as a small size header in place of a header with a partial packet number instead of a packet number. More specifically, in Embodiment 2, in one packet transmission among N packet transmissions, a large size packet 1200 illustrated in FIG. 12 is transmitted and, in each of the remaining packet transmissions among the N packet transmissions, a small size packet 1300 illustrated in FIG. 13 is transmitted.

Figure 12:
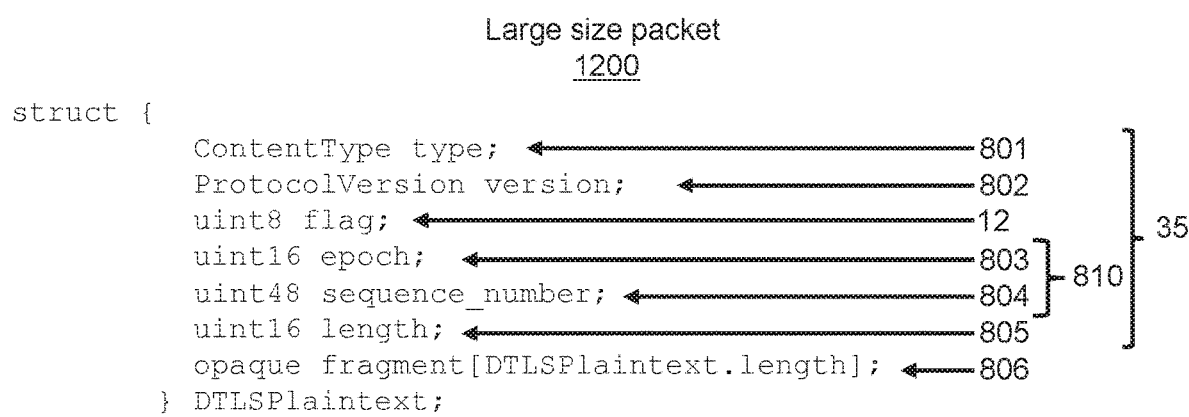
FIG. 12 illustrates a configuration of a large size packet.

FIG. 12 illustrates a configuration of the large size packet 1200.

The large size packet 1200 has a large size header 35 (an example of a third header) and the opaque 806. The large size header 35 has the packet number 810 (specifically, the information 801 to 806 according to the comparative example illustrated in FIG. 8) and a flag 12 indicating whether or not the packet number 810 is included. When the packet number 810 is included, the value of flag 12 is '0.' When there is no packet number 810, the value of flag 12 is '1.'

Figure 13:
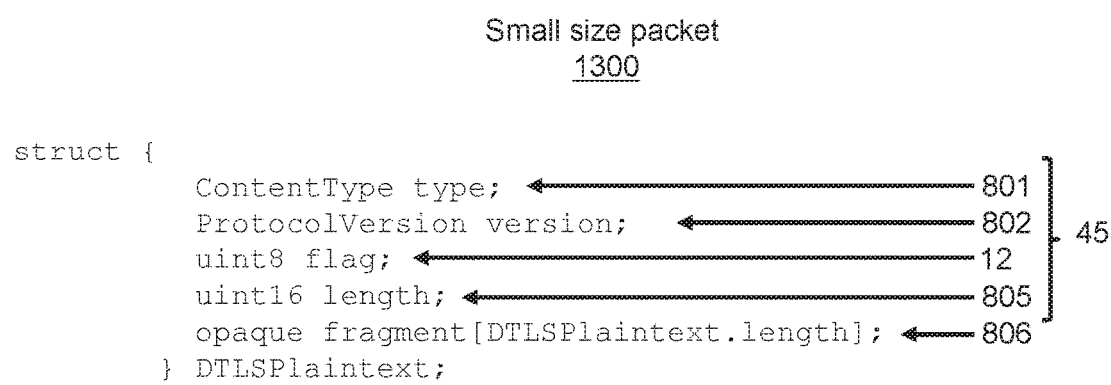
FIG. 13 illustrates a configuration of a small size packet.

FIG. 13 illustrates a configuration of the small size packet 1300.

The small size packet 1300 has a small size header 45 (an example of a second header) and the opaque 806. The small size header 45 has the information of the large size header 35 except for the packet number 810. In other words, the small size header 45 is smaller in size than the large size header 35 by an amount equivalent to the size of the packet number 810 (by an amount equivalent to the omission of the packet number 810).

As described hereinabove, the large size packet 1200 is transmitted in only one packet transmission among N packet transmissions, and the small size packet 1300 is transmitted in the other packet transmissions. Accordingly, the header data volume can be reduced for the N packet transmissions as a whole, and consequently efficient DTLS/UDP packet communication is possible. Note that the value of N is configured in the storage unit 302 (and 202), for example. The value of N may be different for each IoT device 101 or for each session.

Figure 14:
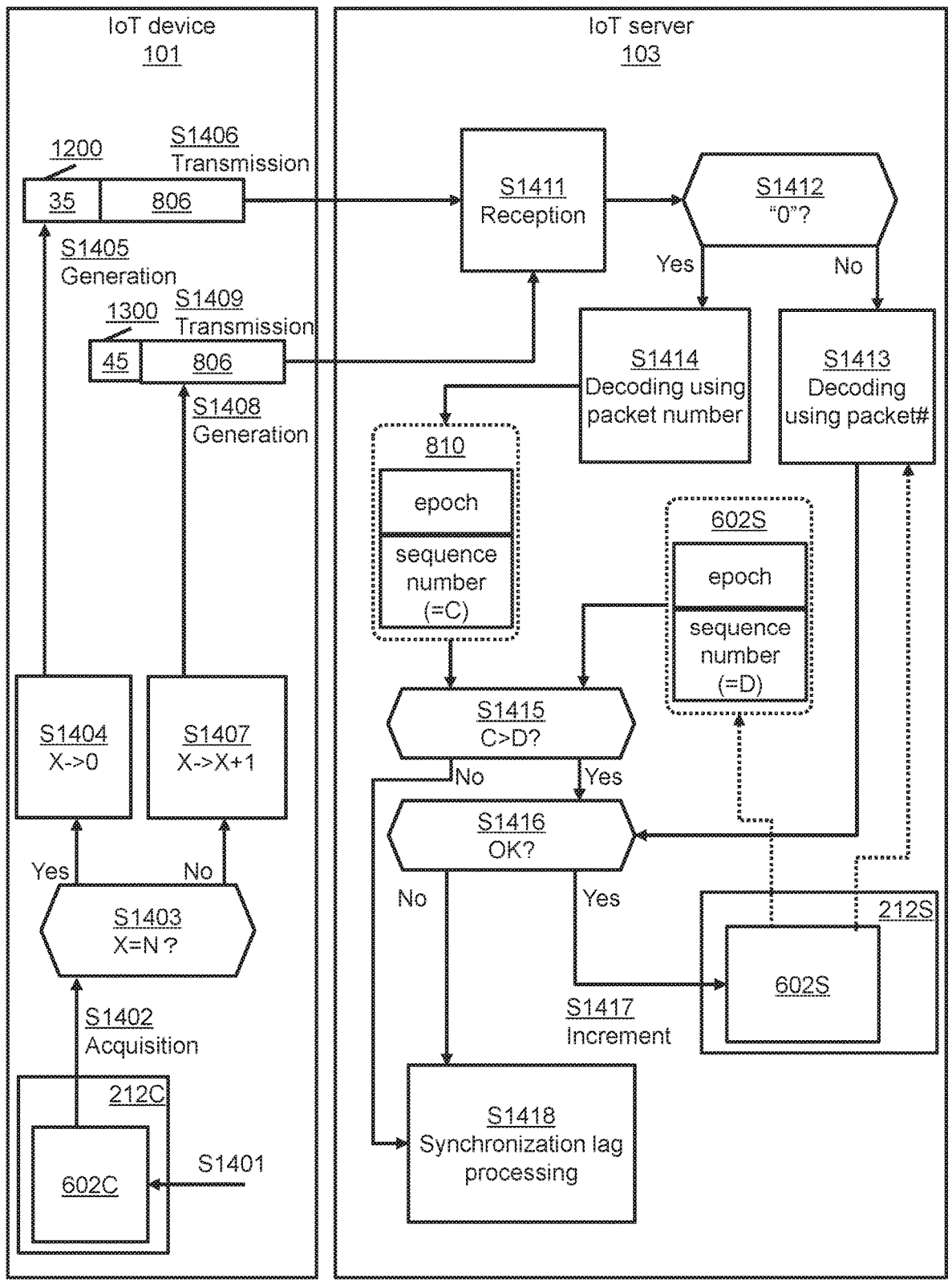
FIG. 14 illustrates the flow of packet send/receive processing according to Embodiment 2.

FIG. 14 illustrates the flow of packet send/receive processing according to Embodiment 2.

After a handshake like that in Embodiment 1 has been performed between the transmission processing unit 1110C of the IoT device 1101 and the reception processing unit 1130S of the IoT server 1103, the following is performed each time a packet is sent or received.

In the IoT device 1101, the packet generation unit 1221C increments the packet #602C (S1401). The packet generation unit 1221C acquires the packet #602C (S1402). The packet generation unit 1221C determines whether or not a packet transmission count X has reached N (S1403). The packet transmission count X is stored in the storage unit 302, for example.

When the determination result of S1403 is true (S1403: Yes), the packet generation unit 1221C restores X to 0 (initial value) (S1404) and generates the large size packet 1200 (S1405). The packet transmission unit 1222C transmits the generated large size packet 1200 to the IoT server 1103 (S1406).

When the determination result of S1403 is false (S1403: No), the packet generation unit 1221C increments X (S1407) and generates the small size packet 1300 (S1408). The packet transmission unit 1222C transmits the generated small size packet 1300 to the IoT server 1103 (S1409).

In the IoT server 1103, the reception processing unit 1130S receives the packet 1200 or 1300 (S1411). The packet number control unit 1231S determines whether or not the flag 12 is '0' (S1412).

When the determination result of S1412 is false (S1412: No), S1413 is performed. That is, the packet number control unit 1231S acquires packet #602S by using the session ID as a search key. The acquired packet #602S corresponds to the packet number estimated for the received packet 1300. The packet processing unit 1232S decrypts the opaque 806 (encrypted data) by using the estimated packet number.

When the determination result of S1412 is true (S1412: Yes), S1414 is performed. That is, the packet number control unit 1231S acquires packet number 810 from the large size header 35. The packet number control unit 1231S acquires packet #602S and compares the sequence number (C) of the packet number with the sequence number (D) of packet #602S (S1415).

When the determination result of S1415 is true (S1415: Yes), S1416 is performed. That is, the packet processing unit 1232S decrypts the opaque 806 (encrypted data) by using the packet number 810.

When the determination result of S1415 is false (S1415: No), the packet processing unit 1232S performs synchronization lag processing (S1418). The synchronization lag processing may be processing including any of the following, for example.

Do not change packet #602S (estimate packet #602S).
Increment packet #602S.

After S1413 or S1415, the packet processing unit 1232S determines whether or not the estimated packet number is OK (S1416). More specifically, the following is performed, for example.

The packet processing unit 1232S calculates the MAC by using the message obtained through the decryption of S1413 or S1415, and the estimated packet number.

The packet processing unit 1232S determines whether or not the calculated MAC matches the MAC which the received packet 1200 or 1300 contains. If the MACs match, the estimated packet number is OK. In other words, when there is a synchronization lag exceeding the allowed synchronization lag, the MACs do not match.

When the determination result of S1416 is true (S1416: Yes), the packet processing unit 1232S increments the packet #602S (S1417).

When the determination result of S1416 is false (S1416: No), the packet processing unit 1232S performs synchronization lag processing (S1418). The synchronization lag processing may be processing including any of the following, for example.

Do not change packet #602S (estimate packet #602S).
Increment packet #602S.

The foregoing is a description of Embodiment 2.

Furthermore, the value of N (that is, the frequency with which the value of flag 12 is '0') may be variable. For example, in a handshake between the IoT device 1101 and the IoT server 1103, the transmission processing unit 1110C and the reception processing unit 1130S are capable of specifying the quality of communication between the IoT device 1101 and IoT server 1103. Therefore, the value of N may be determined on the basis of the specified communication quality and allowed synchronization lag by means of at least one of the transmission processing unit 1110C and the reception processing unit 1130S (by means of the packet number control unit 1231S in the reception processing unit 1130S, for example) in the handshake.

Several embodiments have been described hereinabove but are illustrations to describe the present invention, there being no intention to limit the scope of the present invention to these embodiments alone. The present invention can also be embodied in a variety of other modes. For example, in the foregoing embodiments, client-server communication via the IoT was adopted as an example, but the present invention can also be applied to other client-server communication, or can also be applied to data communication other than client-server communication (P2P data communication, for example).

What is claimed is:

1. A packet communication method, comprising:
   transmitting a packet according to a secure protocol over a high-speed protocol to a reception system by means of a transmission source system;
   receiving a packet having a small size header by means of the reception system; estimating, by means of the reception system, a packet number for the received packet on the basis of reception packet information which is information indicating a packet number of a packet received from the transmission source system; and
   performing, by means of the reception system, processing of the packet by using the estimated packet number,
   wherein a header of each of one or more packets among N packets (where N is an integer of two or more) transmitted by the transmission source system is the small size header,
   in a case in which the small size header is a first header having a partial packet number that is one part of the packet number of the packet, the header of each of the N packets is the first header, and in a case in which the small size header is a second header not having any data bits for the packet number of the packet, the header of each of the packets other than one packet among the N packets is the second header, wherein the small size header is the first header and the partial packet number in the first header includes a lowest order nbit (n<P) among P bits constituting the packet number, wherein the packet number includes a number of a first type which is a number that is updated according to a session update and a number of a second type which is a number that is updated upon each transmission in the same session, wherein the partial packet number further includes a lowest order mbit (m<V) among V bits constituting the number of the first type, and wherein the lowest order nbit is the lowest order nbit among W bits constituting the number of the second type (n<W<P).

2. A reception system that receives packets according to a secure protocol over a high-speed protocol from a transmission source system that transmits the packets, comprising:

a packet number control unit that estimates a packet number for a received packet having a small size header on the basis of reception packet information which is information indicating a packet number of a packet received from the transmission source system; and a packet processing unit that performs processing of the packet by using the estimated packet number, wherein a header of each of one or more packets among N packets (where N is an integer of two or more) transmitted by the transmission source system is the small size header, in a case in which the small size header is a first header having a partial packet number that is one part of the packet number of the packet, the header of each of the N packets is the first header, and in a case in which the small size header is a second header not having any data bits for the packet number of the packet, the header of each of the packets other than one packet among the N packets is the second header, wherein the small size header is the first header and the partial packet number in the first header includes a lowest order nbit (n<P) among P bits constituting the packet number, wherein the packet number includes a number of a first type which is a number that is updated according to a session update and a number of a second type which is a number that is updated upon each transmission in the same session, wherein the partial packet number further includes a lowest order mbit (m<V) among V bits constituting the number of the first type, and wherein the lowest order nbit is the lowest order nbit among W bits constituting the number of the second type (n<W<P).

3. The reception system according to claim 2, wherein the packet number control unit:

acquires the packet number recorded in the reception packet information, and estimates a packet number for a packet having the first header from a relationship between the lowest order nbit in the first header and the lowest order nbit in the acquired packet number.

4. The reception system according to claim 2, wherein the value of n is a value determined on the basis of a communication quality specified in a handshake with the transmission source system and an allowed synchronization lag, and wherein a synchronization lag is the difference between the packet number of the most recently received packet and the packet number of a packet received just before the most recently received packet.

5. The reception system according to claim 2, wherein the small size header is the second header, wherein the header of one packet among the N packets is a third header having the packet number of the packet, wherein the second header and the third header each have a flag indicating whether or not the header has a packet number, wherein the packet number control unit determines whether or not the flag in the header of the received packet indicates that the header has a packet number, wherein, when the result of the determination is true, the estimated packet number is a packet number in the header, and wherein, when the result of the determination is false, the estimated packet number is a packet number recorded in the reception packet information.

6. The reception system according to claim 5, wherein the value of N is a value determined on the basis of a communication quality specified in a handshake with the transmission source system and an allowed synchronization lag, and wherein a synchronization lag is the difference between the packet number of the most recently received packet and the packet number of a packet received just before the most recently received packet.

7. A packet communication system, comprising:

a transmission processing unit which is realized in a transmission source system that transmits a packet; and a reception processing unit which is realized in a reception system that receives the packet, wherein the transmission processing unit transmits a packet according to a secure protocol over a high-speed protocol to the reception system, wherein the reception processing unit estimates a packet number for a packet having a small size header received by the reception system from the transmission source system on the basis of reception packet information which is information indicating a packet number of a packet received from the transmission source system and performs processing of the packet by using the estimated packet number, wherein a header of each of one or more packets among N packets (where N is an integer of two or more) transmitted by the transmission processing unit is the small size header, in a case in which the small size header is a first header having a partial packet number that is one part of the packet number of the packet, the header of each of the N packets is the first header, and in a case in which the small size header is a second header not having any data bits for the packet number of the packet, the header of each of the packets other than one packet among the N packets is the second header, wherein the small size header is the first header and the partial packet number in the first header includes a lowest order nbit (n<P) among P bits constituting the packet number, wherein the packet number includes a number of a first type which is a number that is updated according to a session update and a number of a second type which is a number that is updated upon each transmission in the same session, wherein the partial packet number further includes a lowest order mbit (m<V) among V bits constituting the number of the first type, and wherein the lowest order nbit is the lowest order nbit among W bits constituting the number of the second type (n<W<P).

8. A non-transitory computer-readable medium storing a computer program that causes a computer to operate as a transmission source system that transmits packets to a reception system, the computer program causing the computer to execute:

(a) generating a packet according to a secure protocol over a high-speed protocol, and (b) transmitting the generated packet to the reception system, wherein a header of each of one or more packets among N packets (where N is an integer of two or more) is the small size header, in a case in which the small size header is a first header having a partial packet number that is one part of the packet number of the packet, the header of each of the N packets is the first header, and in a case in which the small size header is a second header not having any data bits for the packet number of the packet, the header of each of the packets other than one packet among the N packets is the second header, wherein the small size header is the first header and the partial packet number in the first header includes a lowest order nbit (n<P) among P bits constituting the packet number, wherein the packet number includes a number of a first type which is a number that is updated according to a session update and a number of a second type which is a number that is updated upon each transmission in the same session, wherein the partial packet number further includes a lowest order mbit (m<V) among V bits constituting the number of the first type, and wherein the lowest order nbit is the lowest order nbit among W bits constituting the number of the second type (n<W<P).

* * * * *